United States Patent [19]

Kelch et al.

[11] Patent Number: 5,374,161
[45] Date of Patent: Dec. 20, 1994

[54] BLADE OUTER AIR SEAL COOLING ENHANCED WITH INTER-SEGMENT FILM SLOT

[75] Inventors: George W. Kelch; Thomas A. Auxier, both of Palm Beach Gardens, Fla.

[73] Assignee: United Technologies Corporation, Hartford, Conn.

[21] Appl. No.: 166,426

[22] Filed: Dec. 13, 1993

[51] Int. Cl.$^5$ ............................... F01D 9/04
[52] U.S. Cl. ................... 415/139; 415/115; 415/116; 415/173.1; 415/173.3; 415/180; 277/199
[58] Field of Search ............... 415/115, 116, 117, 135, 415/138, 139, 173.1, 173.3, 173.4, 180; 277/192, 199, 222

[56] References Cited

U.S. PATENT DOCUMENTS

| | | | |
|---|---|---|---|
| 3,801,220 | 4/1974 | Beckershoff | 415/139 |
| 4,497,610 | 2/1985 | Richardson et al. | 415/117 |
| 4,642,024 | 2/1987 | Weidner | 415/116 |
| 5,167,485 | 12/1992 | Starkweather | 415/139 |

Primary Examiner—Edward K. Look
Assistant Examiner—Christopher Verdier

[57] ABSTRACT

A cooling enhancement for a gas turbine engine blade outer air seal is made up of a plurality of arcuate seal segments, and each one has one or more internal cooling passages. Each segment has a supply surface opposite and in spaced relation to a sealing surface, and first and second end surfaces extending from the sealing surface to the supply surface. Each of the end surfaces includes a substantially planar perpendicular surface and a substantially planar canted surface intersecting at an included angle of between 100 degrees and 140 degrees, and the supply surface has a plurality of cooling orifices adjacent the second end surface. At least one cooling passage extends from the first end surface towards the second end surface, and each cooling passage intersects the first end surface and terminates short of the second end surface. Each cooling passage communicates with the supply surface through at least one of the cooling orifices. Protruding from at least one of the substantially canted surfaces is a plurality of standoff pedestals that are integral with the canted surface.

21 Claims, 4 Drawing Sheets

BLADE OUTER AIR SEAL COOLING ENHANCED WITH INTER-SEGMENT FILM SLOT

The invention was made under a U.S. Government contract and the Government has rights herein.

DESCRIPTION

1. Field of the Invention

This invention relates to gas turbine engines of the type having an annular flow path for working fluid. The invention is specifically related to a seal formed from several seal segments that extend circumferentially about the engine's longitudinal axis and confine the working fluid to the flow path of the engine.

2. Background Art

Axial flow, gas turbine engines typically have a compression section, a combustion section and a turbine section. An annular flow path for the working fluid extends axially through the sections. A stator assembly extends about the annular flow path for confining the working fluid to the flow path and for directing the fluid along the flow path.

As the working fluid flows along the flow path, the working fluid is pressurized in the compression section and burned with fuel in the combustion section to add energy to the working fluid. The hot, pressurized working fluid is expanded through the turbine section to produce work. A major portion of this work is used for driving a free turbine or developing thrust for an aircraft.

A remaining portion of the work generated by the turbine section is not used for these purposes. Instead it is used to compress the working fluid itself. A rotor assembly extends between the turbine section and the compression section to transfer this work from the turbine section to the compression section. The rotor assembly in the turbine section has rotor blades which extend outwardly across the working medium flow path. The rotor blades have airfoils which are angled with respect to the approaching flow to receive work from the working fluid and to drive the rotor assembly about the axis of rotation.

An outer air seal circumscribes the rotor blades to confine the working fluid to the flow path. Typically, outer air seals are metallic and may or may not be coated with ceramic thermal barrier materials to inhibit heat transfer from the working fluid to the seal. The outer air seal is part of the stator structure and is formed of a plurality of arcuate segments. The stator assembly further includes an outer case and a structure for supporting the segments of the outer air seal from the outer case. The outer case and the support structure position the seal segments in close proximity to the blades to block the leakage of the working fluid past the tips of the blades. As a result, the segments are in intimate contact with the hot working fluid, receive heat from the working fluid and are cooled to keep the temperature of the segments within acceptable limits. Adjacent segments are separated by an inter-segment gap which requires secondary flow for cooling, purging, and to prevent leakage of the working fluid through the seal into the static structure.

The use of cooling air increases the service life of the outer air seal in comparison to uncooled outer air seals. However, the use of cooling air decreases the operating efficiency of the engine because a portion of the engine's useful work is used to pressurize the cooling air in the compressor. A decrease in the amount of cooling air required to provide a satisfactory service life for components such as the outer air seal increases the work available for other purposes, such as providing thrust or powering a free turbine, and increases the overall engine efficiency.

Accordingly, what is needed is an outer air seal that minimizes the need for cooling air while providing the cooling necessary to extend the useful life of the outer air seal.

SUMMARY OF THE INVENTION

It is therefore an object of the present invention to provide an outer air seal that minimizes the need for cooling air while providing the cooling necessary to extend the useful life of the outer air seal.

Another object of the present invention is to use spent cooling air to purge the inter-segment gap, thereby reducing the need for secondary. cooling air.

Another object of the present invention is to introduce the film cooling air into the working fluid of the engine at a trajectory that minimizes mixing between the cooling air and the working fluid.

Accordingly, this invention provides a cooling enhancement for a gas turbine engine blade outer air seal which is made up of a plurality of arcuate seal segments, and each has one or more internal cooling passages. Each segment has a supply surface opposite and in spaced relation to a sealing surface, and first and second end surfaces extending from the sealing surface to the supply surface. Each of the end surfaces includes a substantially planar perpendicular surface and a substantially planar canted surface intersecting at an included angle of between 100 degrees and 140 degrees, and the supply surface has a plurality of cooling orifices adjacent said second end surface. At least one cooling passage extends from the first end surface toward the second end surface, and each cooling passage intersects the first end surface and terminates short of the second end surface. Each cooling passage communicates with the supply surface through at least one of the cooling orifices. Protruding from at least one of the substantially canted surfaces is a plurality of stand-off pedestals that are integral with that canted surface.

The foregoing and other features and advantages of the present invention will become more apparent from the following description and accompanying drawings.

DETAILED DESCRIPTION OF THE PREFERRED EMBODIMENT

Figure 1:
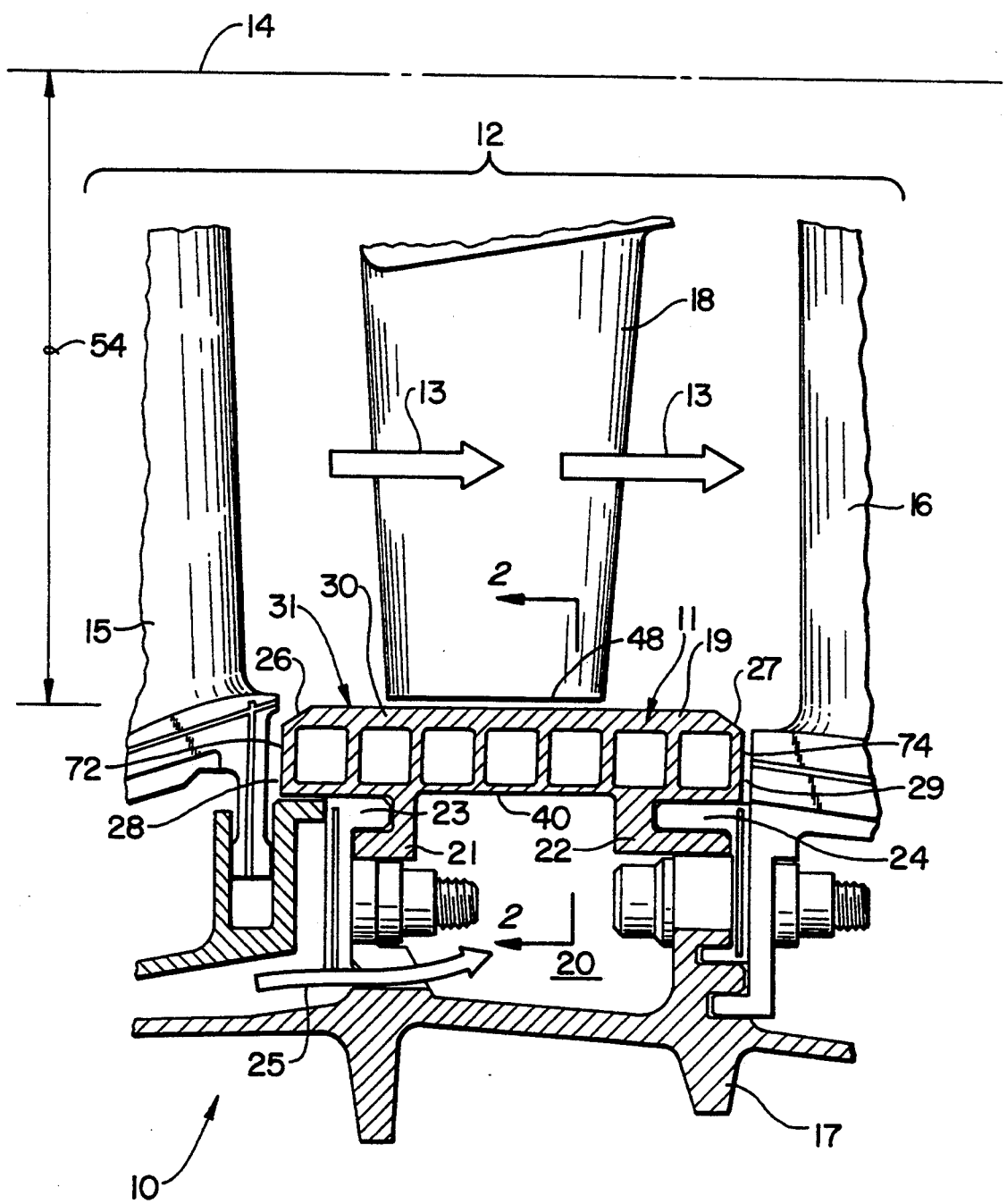
FIG. 1 is a cross-sectional view of a portion of a gas turbine engine incorporating the seal of the present invention.

FIG. 1 shows a portion of an axial flow gas turbine engine 10 having an axis of rotation 14 defined therethrough and incorporating the seal 11 of the present invention. A portion of one rotor stage 12 of the turbine of the engine 10 is shown in FIG. 1 and includes an annular working fluid flow path 13 disposed about the axis 14 for the combustion gases that are the working fluid of the engine. The turbine stage 12 has one stator assembly 15 axially upstream of the stage 12, and another stator assembly 16 axially downstream thereof. The stators 15, 16 are part of the static structure of the engine 10, and each stator assembly 15, 16 includes an outer case 17. The outer case 17 extends circumferentially around the flow path 13 of working fluid.

The turbine stage 12 has a plurality of rotor blades, which are represented by the single rotor blade 18 in FIG. 1, that extend radially outward relative to the axis 14 across the flow path 13 into close proximity with the outer case 17. An outer air seal 11 made up of a plurality of arcuate seal segments (represented by the single seal segment 19 in FIG. 1) extends about the axis 14 to radially bound the annular flow path 13, and the seal 11 circumscribes the tips of the rotor blades 18. The outer air seal 11 is spaced radially inwardly from the outer case 17 leaving a circumferentially extending cavity 20 therebetween. The cavity 20 is in flow communication with a source of cooling air (not shown) and for cooling the segments 19 of the seal 11 as discussed below. Each arcuate seal segment 19 has an upstream attachment hook 21 and a downstream attachment hook 22 to engage upstream and downstream supports 23, 24, respectively, which extend inwardly from the outer case 17. The supports 23, 24 are attached to the outer case 17 to support and position the outer air seal 11 about the rotor blades 18. Each support 23, 24 may be segmented to reduce the hoop strength of the support 23, 24.

A first flow path 25 for cooling air extends inwardly of the outer case 17. The cooling air flow path 25 is bounded by the outer case 17 and extends through the engine outwardly of the flow path 13 of the working fluid. The cooling air flow path extends into the cavity 20 between the outer air seal 11 and the outer case 17.

Each seal segment 19 of the outer air seal 11 has a leading edge 26 and a trailing edge 27. The leading edge 26 is in spaced relation to the adjacent stator assembly 15 leaving a circumferentially extending cavity 28 therebetween. The cavity 28 forms a second cooling air flow path which extends axially and circumferentially beneath the leading edge region. The trailing edge 27 is in spaced relation to adjacent stator assembly 16 leaving an annular cavity 29 therebetween which forms a third cooling air flow path.

Figure 2:
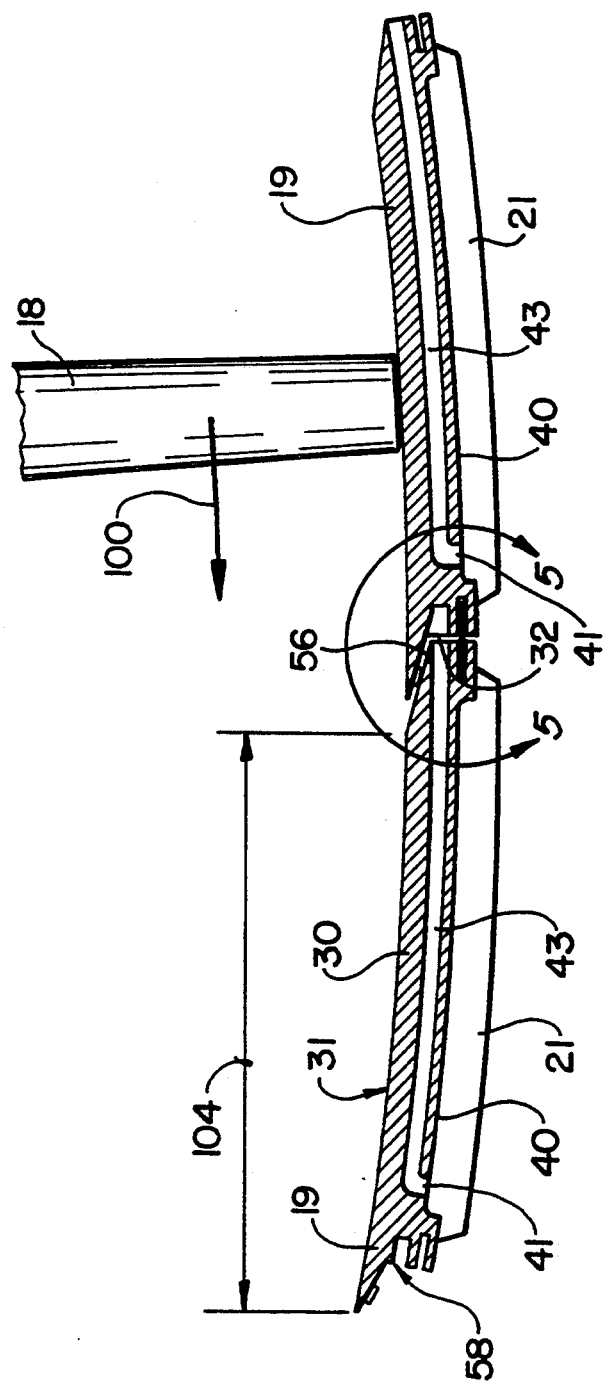
FIG. 2 is a cross-sectional view of an arcuate segment of the seal of the present invention taken along line 2—2 of FIG. 1.

As shown in FIG. 2, each seal segment 19 has a metallic base 30 that has an arcuate sealing surface 31 that extends circumferentially about the axis 14 and the flow path 13. Each seal segment 19 is spaced radially outward from the blades 18, and the blades 18 rotate past the segments 19 in a first direction 100. The metallic base is integral with the hooks 21, 22. Adjacent seal segments 19 are spaced circumferentially from each other leaving an inter-segment gap 32 therebetween to allow for thermal expansion of the segments 19. The inter-segment gap 32 varies in size under various operative conditions of the engine 10. The inter-segment gap 32 terminates at a film slot 33 at the sealing surface 31.

As those skilled in the art will readily appreciate, due to the extremely high temperature of the working fluid, the segments 19 of the outer air seal 11 absorb heat from the working fluid. Since the metallic base 30 is generally made of a material that has relatively low creep strength at the temperature of the working fluid 13, each of the segments 19 must be cooled to maintain the temperature of the metallic base 30 well below the temperature of the working fluid 13.

Referring again to FIG. 1, each blade 18 extends radially outward relative to the axis 14 and terminates at a blade tip 48. The tip 48 of each 18 blade is in spaced relation to the annular seal 11, and the sealing surface 31 of each segment 19 faces the turbine blades 18 and the working fluid flow path 13. A portion of the sealing surface 31 of each segment 19 radially outward from the blade tip 48 preferably includes a coating of an abradable material, and another portion of the sealing surface 31 at the leading and trailing edges 26, 27 preferably includes a coating of a thermal barrier material. Such abradable and thermal barrier materials are well known in the art, and therefore are not detailed further in this disclosure.

Referring now to FIG. 2, opposite the sealing surface 31, and radially outward therefrom, is a coolant supply surface 40 that is substantially parallel to, but offset from, the sealing surface 31. The coolant supply surface 40 has a plurality of cooling air inlet orifices 41 extending therethrough. These orifices 41 are sized to meter the flow of cooling air therethrough based on the supply pressure of the cooling air and the desired heat transfer from the seal segments 19.

Figure 3:
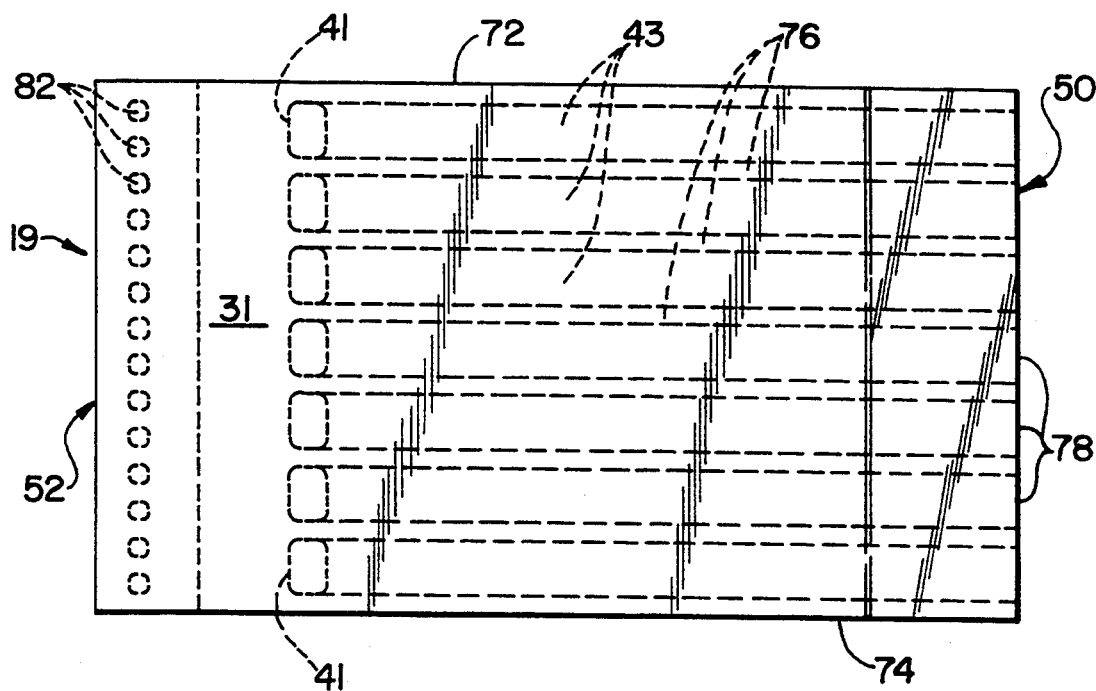
FIG. 3 is a plan view of the sealing surface of one of the segments of the present invention, showing the cooling passages and stand-off pedestals in phantom.
Figure 4:
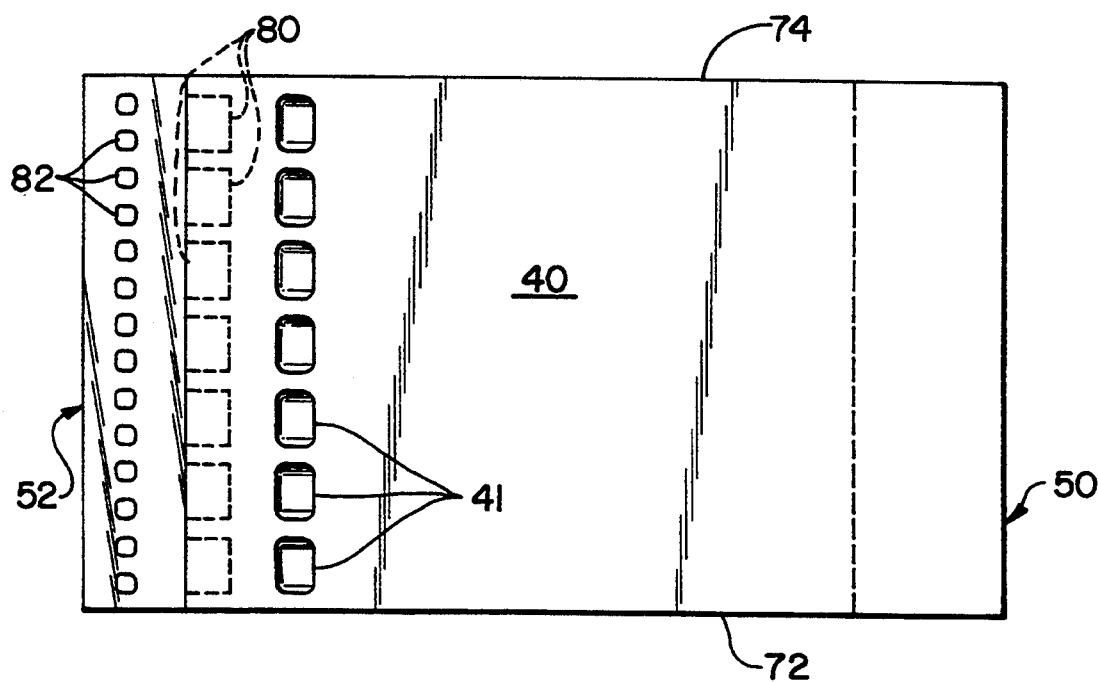
FIG. 4 is a plan view of the supply surface of one of the segments of the present invention, with the attachment hooks and feather seal channels omitted for clarity.
Figure 5:
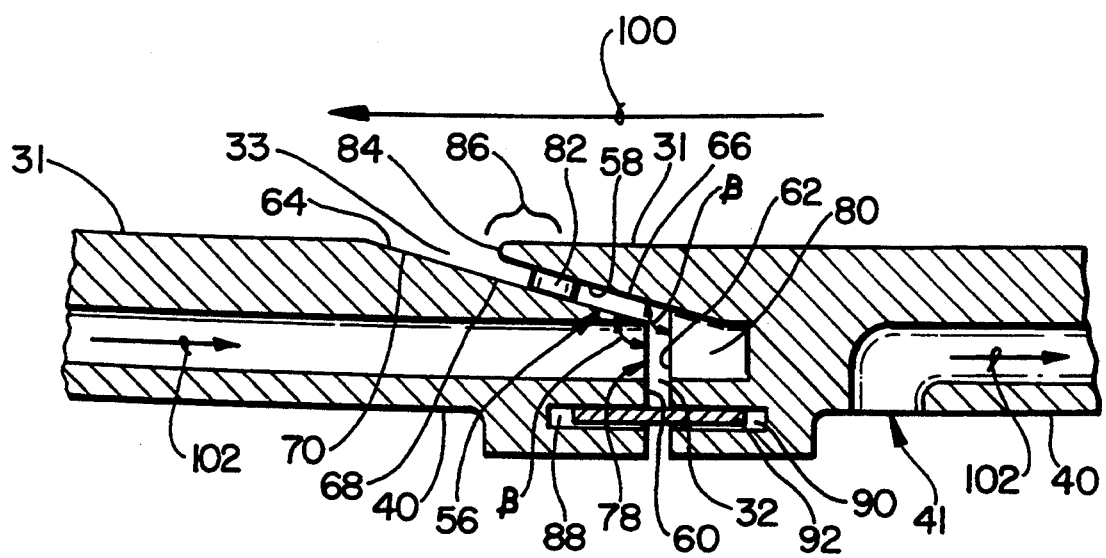
FIG. 5 is an enlarged view taken along line 5—5 of FIG. 2.

Referring now to FIGS. 3 and 4, the arcuate sealing surface of each seal segment 19 has a first end 50 and a second end 52 opposite the first end 50. The arcuate sealing surface 31 has a radius of curvature equal to the distance 54 between the sealing surface 31 and the axis 14 as shown in FIG. 1. Each segment 19 has a first end surface 56 extending along the entire first end 50 of the sealing surface 31, and a second end surface 58 extending along the entire second end 52. As shown in Figure 5, the first and second end surfaces 56, 58 extend from the sealing surface 31 to the supply surface 40, and each of the first and second end surfaces 56, 58 has a substantially planar perpendicular surface 60, 62 and a substantially planar canted surface 64, 66. The planar and canted surfaces 60, 62, 64, 66 of each end surface 56, 58 intersect at an included angle $\beta$ of between 100 degrees and 140 degrees, and each canted surface 64, 66 is canted in the first direction 100. As used herein, the phrase "canted in the first direction" means that for a given reference point 68 on one of the canted surfaces 64, 66, any other reference point 70 on that canted surface 64, 66 which lies to the first direction (i.e. to the left in Figure 5) of the given reference point 68 is spaced from the sealing surface 31 a distance which is less than the distance of the given reference point from the sealing surface 31.

Referring again to FIG. 1, each segment 19 has a first side surface 72 and a second side surface 74, and each of the side surfaces 72, 74 extends from the sealing surface 31 to the supply surface 40, and, as shown in FIG. 3, from the first end surface 56 to the second end surface 58. Between the supply surface 40 and the sealing surface 31 there are, preferably, a plurality of cooling passages 43 extending along the length of the segment 19 from the first end surface 56 toward the second end surface 58. The cooling passages 43 are located between the sealing surface 31, the supply surface 40, and the side surfaces 72, 74, and each of the cooling passages 43 is separated from adjacent cooling passages 43 by a wall 76 therebetween. Each cooling passage 43 intersects the first end surface 56 and terminates short of the second end surface 58. Each cooling passage 43 communicates with the supply surface 40 through at least one of the cooling orifices 41. Although the preferred embodiment is shown and described in terms of a segment having a plurality of passages 43, a single, wide passage having a plurality of columns or pedestals therein would also suffice, so long as the quantity and placement of the columns is sufficient to provide heat transfer from the sealing surface to the cooling air in the passage, and also sufficient to support the sealing surface against collapse into the passage in the event the blades 18 rub into the sealing surface 31.

As shown in FIGS. 2–4, each of the orifices 41 is adjacent said second end surface 58 and each cooling passage 43 communicates with the first end surface 56 of the same segment 19 through at least one passage outlet 78. Thus, cooling air entering the orifices 41 must flow through the passages 43 in a second direction 102 which is opposite the direction 100 of rotation of the blades 18 (the first direction 100).

The second end surface 58 of each segment 19 includes a quantity of cooling air feed pockets 80 equal to the quantity of passage outlets 78 in the first end surface 56 of the same segment 19. The purpose of the feed pockets 80 is to receive and turn the cooling air flowing from the passages 43, and feed the cooling air flowing from the passage outlets 78 so that the cooling air flows into the adjacent inter-segment gap 32, as shown in FIG. 5. Accordingly, each feed pocket 80 is aligned with one of the cooling passage outlets 78 of one of the adjacent segments 19.

Protruding from at least one of the substantially planar canted surfaces 66 of each segment 19 are a plurality of stand-off pedestals 82. The pedestals 82 insure that a minimum flow area is maintained in the inter-segment gap 32 during all engine operating conditions. The pedestals 82 are integral with one of the substantially canted surfaces 66, and extend toward one of the substantially planar canted surfaces 64 of one of the adjacent segments 19. Although the pedestals 82 of the present invention are shown as being integral with the canted surface 64 of the second end surface 58, those skilled in the art will readily appreciate that the pedestals 82 could be integral with the canted surface 64 of the first end surface 56, or some of the pedestals 82 could be integral with the canted surface 64 of the first end surface 56 and other pedestals 82 could be integral with the canted surface 66 of the second end surface 58, the latter pedestals 82 being offset from the pedestals 82 of the canted surface 64 of the first end surface 56. The pedestals 82 of each segment 19 are preferably aligned in a row extending between the first side surface 72 and the second side surface 74 of each segment 19, as shown in FIG. 4. 1.5 Referring now to FIG. 5, the sealing surface 31 of each segment is radiused 84 where it joins the substantially planar canted surface 66 of the second end surface 58. This radius 84, or curvature 84, provides a smooth transition between substantially planar canted surface 66 of the second end surface 58 and the sealing surface 31 of the same segment 19. The radius of curvature of this transition 84 is not critical, but those skilled in the art will appreciate that during some engine operating conditions, the blades 18 are likely to rub into the sealing surface 31 of each segment 19. If the second end 52 of the sealing surface 31 were not radiused, the segment tip 86 (where the second end of the sealing surface 31 meets the second end surface 58) may break off due to the small cross-sectional area of the segment at the second end 52 of the sealing surface 31.

Each of the substantially planar perpendicular surfaces 60, 62 of each segment 19 includes a channel 88, 90 located between the first side surface 72 and the second side surface 74. The channels 88, 90 of each segment 19 are substantially parallel to the supply surface 40 thereof, as shown in FIG. 5. (The channels have been omitted from FIGS. 3 and 4 for clarity purposes, since the purpose of those figures is to show other features of the segments 19.) Each channel 88, 90 is opposed to, and in spaced relation to, one of the channels 88, 90 of one of the adjacent segments 19, and an inter-segment feather seal 92 extends between each of the opposed channels 88, 90 to prevent direct communication of the cooling air between the supply surface 40 and the inter-segment gap 32.

In operation, cooling air from the cavity 20 flows into the cooling air passages 43 of the present invention through the metering orifices 41 located at the supply surface 40 of the seal segment 19. The cooling air then flows through the passages 43 in a direction 102 opposite the direction 100 of the rotation of the blades 18, thereby cooling the walls 76 and absorbing heat that has been conducted from the sealing surface 31 of the segment 19. The spent cooling air then exits the passages 43 through one of the discharge outlets 78 and collects in the feed pocket 80 aligned therewith.

The cooling air is then directed into the inter-segment gap 32, where it flows out past the pedestals 82 to provide film cooling of the sealing surface 31. The film travels in the direction 100 of the rotation of the blades 18, and cools the sealing surface 31 adjacent the first end surface 56. By introducing the cooling air into the passages 43 adjacent the second end surface 58 of the segment 19 and flowing the cooling air in a direction 102 opposite that of the rotation of the blades 18, the cooling air is used to cool the portion of the sealing surface 31 which is distant from first end surface 56 (i.e. the portion of the sealing surface 31 which is both cooled and protected by the film cooling). Thus, the sealing surface 31 distant from the first end surface 56 is cooled by conductive heat transfer to the cooling air at its coolest temperature, producing a higher conductive heat transfer rate than occurs between the cooling air and the sealing surface 31 adjacent the first end surface 56. The lower heat transfer rate adjacent the first end surface 56 is acceptable since the sealing surface is both cooled and shielded by the film of spent cooling air adjacent the first end surface 56 of the segment 19.

The blade outer air seal 11 of the present invention uses the inter-segment gap 32 to create a film slot 33 that inhibits working fluid 13 infiltration into the inter-segment gap 32 and eliminates the need for additional purge air. The present invention uses spent convective cooling air to purge the inter-segment gap 32 and discharges the cooling air through the film slot 33 tangentially as a cooling air film to provide supplemental film cooling of the blade outer air seal. As those skilled in the art will readily appreciate, by canting the inter-segment gap 32 in the direction 100 of blade rotation, the "bow-wave" from the suction-side of the blade tip 48 assists in spreading the film across the sealing surface 31 of the segment 19. The boundary layer attachment of the higher density cooling film is enhanced by the centrifugal Grashof effect, and a high tangential velocity results from the combined effects of the cooling air film injection direction and blade wiping. As a result, the sealing surface 31 is subjected to a cooler boundary layer, and mixing with the working fluid flow path is attenuated by this buoyancy effect. As shown in Figure 2, the circumferential length 104 of the sealing surface 31 of each segment 19 is preferably chosen such that the cooling air film discharged from the inter-segment gap 32 and film slot 33 will travel from the first end surface 56 of a segment 19 to the second end surface 58 of the sealing surface 31 of that segment 19 prior to being forced downstream of the blade outer air seal 11 by the working fluid 13 of the engine 10. The film slot 13 configuration shields the inter-segment feather seal 92 from infiltration by the working fluid 13 of the engine 10. Since the feed pockets 80 prevent convective air supply blockage with in the event that thermal expansion or blade rub induces closure of the inter-segment gap 32, circumferential tolerances of the segments 19 of the present invention are less critical than those of the prior art.

Although this invention has been shown and described with respect to a detailed embodiment thereof, it will be understood by those skilled in the art that various changes in form and detail thereof may be made without departing from the spirit and scope of the claimed invention.

We claim:

1. An engine seal for an axial flow gas turbine engine having an axis of rotation defined therethrough, an annular flow path concentric with said axis for working fluid flowing through at least one turbine stage of said engine, said one turbine stage including a plurality of turbine blades extending outward from said axis, and said flow path bounded by a static structure, and an annular seal secured to said static structure radially outward of said one turbine stage, said seal absorbing heat from said working fluid, said turbine blades rotating in a first direction relative to said seal, said seal comprising:

a plurality of arcuate seal segments extending circumferentially about the flow path, each segment spaced radially outward from said turbine blades, each seal segment including an arcuate sealing surface having a first end, a second end opposite the first end, and a radius of curvature equal to the distance between the sealing surface and the axis, a supply surface opposite and in spaced relation to the sealing surface and having a plurality of cooling orifices extending therethrough, a first end surface extending along the entire first end, and a second end surface extending along the entire second end, said first and second end surfaces extending from said sealing surface to said supply surface, each of said first and second end surfaces including a substantially planar perpendicular surface and a substantially planar canted surface intersecting at an included angle of between 100 degrees and 140 degrees, and each canted surface is canted in the first direction, a first side surface and a second side surface, each of said side surfaces extending from said sealing surface to said supply surface and from said first end surface to said second end surface, at least one cooling passage extending from the first end surface toward the second end surface, said cooling passage located between said sealing surface, said supply surface, and said side surfaces, said cooling passage intersecting the first end surface and terminating short of said second end surface, and said cooling passage communicating with the supply surface through at least one of the cooling orifices, wherein each segment is spaced circumferentially from each adjacent segment defining an inter-segment gap therebetween, cooling air from said supply enters said passage through one of said orifices, flows through said passage in a second direction and exits said cooling passage into one of said inter-segment gaps at said first end supply and discharges from the inter-segment gap into the working fluid of the engine.

2. The engine seal of claim 1 wherein each segment includes a plurality of said cooling passages that communicate with said orifices, each of said orifices is adjacent said second end surface, each said cooling passage communicates with the first surface of said segment through at least one passage outlet, each of said cooling passages is separated from adjacent cooling passages by a wall therebetween, the cooling air flows through each passage in the second direction, and the second direction is opposite said first direction.

3. The seal of claim 2 wherein the second surface of each segment includes a quantity of cooling air feed pockets equal to the quantity of passage outlets in the first surface of the same segment, and each feed pocket is aligned with one of the passage outlets of one of the adjacent segments, said feed pockets for receiving and turning air flowing into the inter-segment gaps.

4. The seal of claim 3 wherein each segment further includes a plurality of stand-off pedestals protruding from one of the substantially canted surfaces thereof toward one of the canted surfaces of one of the adjacent segments, and said pedestals are integral with one of the substantially canted surfaces.

5. The seal of claim 4 wherein the pedestals of each segment are aligned in a row extending between the first side surface and the second side surface thereof.

6. The seal of claim 5 wherein the sealing surface of each segment is radiused where it joins the second substantially canted surface thereof, thereby providing a smooth transition between the second substantially canted surface and the sealing surface thereof.

7. The seal of claim 6 wherein said each of the substantially perpendicular surfaces of each segment includes a channel, the channels of each segment are substantially parallel to the supply surface thereof, each channel is in spaced relation and opposed to the one of the channels of one of the adjacent segments, and an inter-segment seal extends between each of said opposed channels.

8. A circumferential seal comprising:

a plurality of arcuate seal segments, each seal segment including an arcuate sealing surface having a first end, and a second end opposite the first end, a supply surface opposite and in spaced relation to the sealing surface and having a plurality of cooling orifices extending therethrough, a first end surface extending along the entire first end, and a second end surface extending along the entire second end, said first and second end surfaces extending from said sealing surface to said supply surface, each of said first and second end surfaces including a substantially planar perpendicular surface and a substantially planar canted surface intersecting at an included angle of between 100 degrees and 140 degrees, and said orifices adjacent said second end surface, a first side surface and a second side surface, each of said side surfaces extending from said sealing surface to said supply surface and from said first end surface to said second end surface, at least one cooling passage extending from the first surface toward the second surface, each cooling passage located between said sealing surface and said supply surface, each cooling passage intersecting the first surface and terminating short of said second surface, each cooling passage communicating with the supply surface through at least one of the cooling orifices, wherein each segment is located immediately adjacent two other of said segments, the first surface of each of said segments is in spaced relation to the second surface of one of said two immediately adjacent segments defining an inter-segment gap therebetween, and the second surface of each of said segments is in spaced relation to the first surface of the other of said two adjacent segments, defining another inter-segment gap therebetween.

9. The seal of claim 8 wherein each segment includes a plurality of said cooling passages, each said cooling passage communicates with the first surface of said segment through at least one passage outlet, and each of said cooling passages is separated from adjacent cooling passages by a wall therebetween.

10. The seal of claim 9 wherein the second surface of each segment includes a quantity of cooling air feed pockets equal to the quantity of passage outlets in the first surface of the same segment, and each feed pocket is aligned with one of the passage outlets of one of the adjacent segments.

11. The seal of claim 10 wherein each segment further includes a plurality of stand-off pedestals protruding from one of the substantially canted surfaces thereof toward one of the canted surfaces of one of the adjacent segments, and said pedestals are integral with one of the substantially canted surfaces.

12. The seal of claim 11 wherein the pedestals of each segment are aligned in a row extending between the first side surface and the second side surface thereof.

13. The seal of claim 12 wherein the sealing surface of each segment is radiused where it joins the second substantially canted surface thereof, thereby providing a smooth transition between the second substantially canted surface and the sealing surface thereof.

14. The seal of claim 13 wherein said each of the substantially perpendicular surfaces of each segment includes a channel, the channels of each segment are substantially parallel to the supply surface thereof, each channel is in spaced relation and opposed to the one of the channels of one of the adjacent segments, and an inter-segment seal extends between each of said opposed channels.

15. A seal segment comprising:
a sealing surface having a width and a length, said length terminating in a first end and a second end opposite the first end, said sealing surface arcuate between said first and second ends, a supply surface opposite and in spaced relation to the sealing surface and having a plurality of cooling orifices extending therethrough, a first end surface extending along the entire first end, and a second end surface extending along the entire second end, said first and second end surfaces extending from said sealing surface to said supply surface, each of said first and second end surfaces including a substantially planar perpendicular surface and a substantially planar canted surface intersecting at an included angle of between 100 degrees and 140 degrees, and said orifices adjacent said second end surface, a first side surface and a second side surface, each of said side surfaces extending from said sealing surface to said supply surface and from said first end surface to said second end surface, at least one cooling passage extending from the first end surface toward the second end surface, each said cooling passage located between said sealing surface, said supply surface and the first and second side surfaces, each said cooling passage intersecting the first end surface and terminating short of said second end surface, each said cooling passage communicating with the supply surface through at least one of the cooling orifices.

16. The seal segment of claim 15 further comprising a plurality of said cooling passages, each said cooling passage communicates with the first end surface through at least one passage outlet, and each of said cooling passages is separated from adjacent cooling passages by a wall therebetween.

17. The seal of claim 16 wherein the second end surface includes a quantity of cooling air feed pockets equal to the quantity of passage outlets in the first end surface, and each feed pocket is aligned with one of the passage outlets.

18. The seal of claim 17 further comprising a plurality of stand-off pedestals protruding from one of the substantially canted surfaces thereof, and said pedestals are integral with one of the substantially canted surfaces.

19. The seal of claim 18 wherein said pedestals are aligned in a row extending between the first side surface and the second side surface.

20. The seal of claim 19 wherein the sealing surface is radiused where it joins the second substantially canted surface, thereby providing a smooth transition between the second substantially canted surface and the sealing surface.

21. The seal of claim 20 wherein said each of the substantially perpendicular surfaces includes a channel, each channel is substantially parallel to the supply surface, and each channel is located between the first side surface and the second side surface.

* * * * *

UNITED STATES PATENT AND TRADEMARK OFFICE
CERTIFICATE OF CORRECTION

PATENT NO. : 5,374,161
DATED : December 20, 1994
INVENTOR(S) : George W. Kelch et al It is certified that error appears in the above-indentified patent and that said Letters Patent is hereby corrected as shown below:

In column 5, at line 59, change "the scaling surface" to --the sealing surface--.

In column 8, at line 16, change "first end supply" to --first end surface--.

In column 10, at line 44, change "teed pocket" to --feed pocket--.

Signed and Sealed this

Fourth Day of July, 1995

Attest:

BRUCE LEHMAN

*Attesting Officer*   *Commissioner of Patents and Trademarks*